(12) United States Patent
Fujimoto et al.

(10) Patent No.: US 10,619,588 B2
(45) Date of Patent: Apr. 14, 2020

(54) CONTROLLER FOR INTERNAL COMBUSTION ENGINE

(71) Applicant: AISIN SEIKI KABUSHIKI KAISHA, Kariya-shi, Aichi-ken (JP)

(72) Inventors: Seiichi Fujimoto, Chiryu (JP); Hirokazu Tanaka, Nagoya (JP); Masaaki Kaneko, Aichi-ken (JP); Tomohiro Kozaki, Kariya (JP); Suguru Kamiya, Takahama (JP); Atsushi Hanaura, Aichi-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/033,617

(22) Filed: Jul. 12, 2018

(65) Prior Publication Data

US 2019/0017457 A1 Jan. 17, 2019

(30) Foreign Application Priority Data

Jul. 14, 2017 (JP) .................................. 2017-137597

(51) Int. Cl.
*F02D 41/22* (2006.01)
*F01L 1/344* (2006.01)
(Continued)

(52) U.S. Cl.
CPC .............. *F02D 41/22* (2013.01); *F01L 1/053* (2013.01); *F01L 1/3442* (2013.01);
(Continued)

(58) Field of Classification Search
CPC . F01L 1/053; F01L 1/3442; F01L 2001/0537; F01L 2001/3443;
(Continued)

(56) References Cited

U.S. PATENT DOCUMENTS 6,330,870 B1   12/2001   Inoue et al.
6,799,553 B1   10/2004   Takenaka et al.
(Continued)

FOREIGN PATENT DOCUMENTS

JP   2001-152883 A   6/2001
JP   2004-316635 A   11/2004
(Continued)

*Primary Examiner* — Devon C Kramer
*Assistant Examiner* — Kelsey L Stanek
(74) *Attorney, Agent, or Firm* — Buchanan Ingersoll & Rooney PC

(57) ABSTRACT

A controller for an internal combustion engine includes: a failure determination section which determines a failure state in a case where a relative rotation phase of an intake side valve opening and closing timing control mechanism does not change when controlling the mechanism after starting the driving of a starter motor and trying to change the relative rotation phase of the mechanism in a start control for starting an internal combustion engine. When the section determines a failure, the controller performs at least one of an intake air amount increase control in which an opening degree of a throttle valve is increased, an ignition timing advance angle control in which injection of fuel is performed at a timing earlier than a set timing and ignition is performed, and a multi-injection control in which the fuel is injected immediately before the ignition in addition to the fuel injection in an intake stroke.

4 Claims, 9 Drawing Sheets

(51) Int. Cl.
*F01L 1/053* (2006.01)
*F02D 13/02* (2006.01)
*F02D 41/06* (2006.01)
*F02D 41/40* (2006.01)
*F02D 37/02* (2006.01)
*F02D 41/00* (2006.01)
*F02N 19/00* (2010.01)

(52) U.S. Cl.
CPC ...... *F02D 13/0219* (2013.01); *F02D 13/0261* (2013.01); *F02D 13/0265* (2013.01); *F02D 37/02* (2013.01); *F02D 41/0002* (2013.01); *F02D 41/062* (2013.01); *F02D 41/221* (2013.01); *F02D 41/402* (2013.01); *F01L 2001/0537* (2013.01); *F01L 2001/3443* (2013.01); *F01L 2001/34426* (2013.01); *F01L 2001/34463* (2013.01); *F01L 2001/34466* (2013.01); *F01L 2001/34473* (2013.01); *F01L 2001/34483* (2013.01); *F01L 2250/02* (2013.01); *F01L 2800/01* (2013.01); *F01L 2800/11* (2013.01); *F01L 2820/041* (2013.01); *F02D 2041/001* (2013.01); *F02D 2041/227* (2013.01); *F02N 19/004* (2013.01)

(58) Field of Classification Search
CPC ... F01L 2001/34426; F01L 2001/34463; F01L 2001/34466; F01L 2001/34473; F01L 2001/34483; F02D 41/22; F02D 41/0022; F02D 41/062; F02D 41/402; F02D 13/0219; F02D 13/0261; F02D 13/0265
USPC .............................. 123/90.17, 90.15, 90.16
See application file for complete search history.

(56) References Cited

U.S. PATENT DOCUMENTS

| | | |
|---|---|---|
| 8,855,893 B2 | 10/2014 | Oe et al. |
| 2016/0040606 A1 | 2/2016 | Kosaka et al. |
| 2017/0122139 A1 | 5/2017 | Kaneko |

FOREIGN PATENT DOCUMENTS

| | | |
|---|---|---|
| JP | 2009-052493 A | 3/2009 |
| JP | 2012-041876 A | 3/2012 |
| JP | 2016-037878 A | 3/2016 |
| JP | 2016-070069 A | 5/2016 |

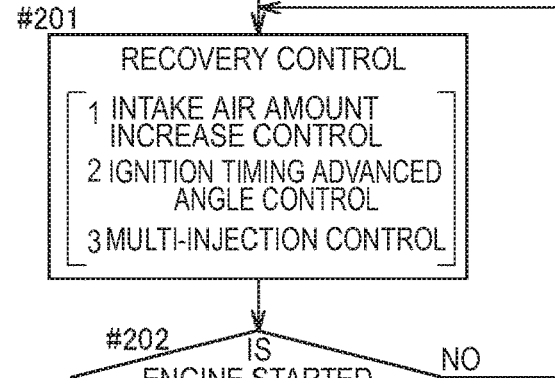
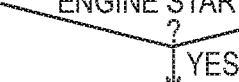
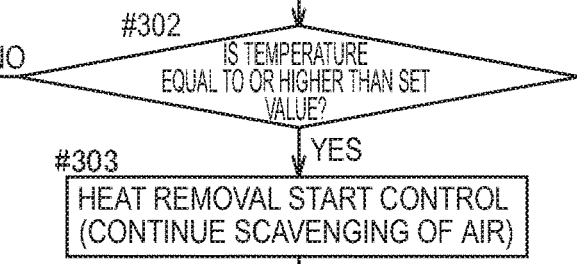
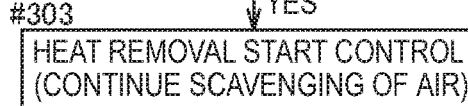
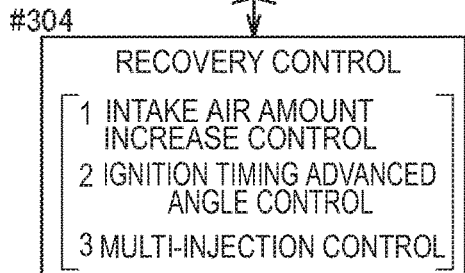
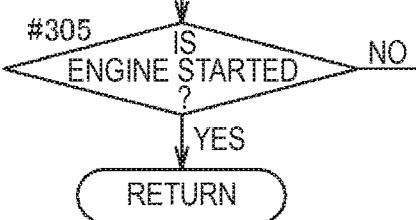

CONTROLLER FOR INTERNAL COMBUSTION ENGINE

CROSS REFERENCE TO RELATED APPLICATIONS

This application is based on and claims priority under 35 U.S.C. § 119 to Japanese Patent Application 2017-137597, filed on Jul. 14, 2017, the entire contents of which are incorporated herein by reference.

TECHNICAL FIELD

This disclosure relates to a controller for an internal combustion engine which sets an opening and closing timing of an intake valve or an exhaust valve by a valve opening and closing timing control mechanism.

BACKGROUND DISCUSSION

JP 2001-152883A (Reference 1) discloses a technology in which a valve opening and closing timing control mechanism which sets respective opening and closing timings that correspond to intake valves and exhaust valves is provided, and in a case where a locked state cannot be released due to a failure or the like of the valve opening and closing timing control mechanism of the intake valve, the valve opening and closing timing control mechanism of the exhaust valve is controlled to the most advance angle phase.

In the technology described in Reference 1, in a case where a lock mechanism of the valve opening and closing timing control mechanism which controls the intake valve cannot be unlocked due to a failure or the like, and the opening and closing timing of the intake valve is fixed to an intermediate phase, a valve overlap is set to be small by controlling the valve opening and closing timing control mechanism of the exhaust valve to the most advance angle phase, and deterioration of a combustion state is suppressed by reducing an internal EGR.

In addition, JP 2016-70069A (Reference 2) discloses a technology in which an electric type valve opening and closing timing control mechanism for setting the respective opening and closing timings that correspond to the intake valve and the exhaust valve is provided, and in a case where the valve opening and closing timing control mechanism fails, control is performed such that an ignition timing is advanced or an overlap period is shortened.

In the technology described in Reference 2, startability of an internal combustion engine is improved by advancing the ignition timing, and a compression ratio is increased by shortening the overlap period.

In an internal combustion engine provided with a valve opening and closing timing control mechanism which operates hydraulically, there is also a case where the internal combustion engine is started in a situation where a hydraulic pump or a control valve fails and a hydraulic pressure of hydraulic oil becomes insufficient. In such a situation, not only the valve opening and closing timing control mechanism does not appropriately operate, but also the opening and closing timing (valve timing) set by the valve opening and closing timing control mechanism is displaced to the most delay angle by an action of a cam fluctuation torque, and there is also a case where the opening and closing timing of the valve is fixed to the most delay angle phase when starting the internal combustion engine.

In addition, in the valve opening and closing timing control mechanism provided with the lock mechanism which holds the opening and closing timing at the intermediate phase, for example, in a case where the locked state of the lock mechanism cannot be released due to a failure, there is also a case where the opening and closing timing is fixed to the intermediate phase.

Furthermore, although the insufficiency of the hydraulic pressure of the hydraulic oil has been described as a type of the failure in which the valve opening and closing timing control mechanism does not appropriately operate, a mechanical failure on the inside of the valve opening and closing timing control mechanism may be considered, and even in a case where the valve opening and closing timing control mechanism does not appropriately operate due to a mechanical malfunction, there is also a case where the opening and closing timing (valve timing) is fixed to the most delay angle phase or the intermediate phase.

The valve opening and closing timing control mechanism is provided to control the opening and closing timing of the intake valve in many cases, and in a case where the opening and closing timing falls into the situation of being fixed to the most delay angle phase due to a failure, an intake air amount decreases, and thus, a compression ratio decreases, and not only the startability of the internal combustion engine deteriorates but also the combustion after the starting is made unstable.

In addition, in a case where the opening and closing timing (valve timing) of the intake valve is fixed to the intermediate phase due to a failure, the intake air amount when starting the internal combustion engine is not insufficient, and thus, although a necessary compression ratio is ensured, an overlap state where the exhaust valve and the intake valve are open at the same time is fixed. In such a situation where the overlap state is fixed, the combustion after the start of the internal combustion engine becomes unstable.

In other words, in the overlap state, since the combustion is continued by supplying the fuel to the combustion chamber in a state where a part of the combustion gas remains in the combustion chamber (state of the internal EGR), the fresh air becomes insufficient and the combustion becomes unstable. In particular, in a case of starting the internal combustion engine in a situation where the temperature of the internal combustion engine is higher than a set value and the overlap state is fixed due to a failure, there is also a case where the abnormal combustion is caused and the starting is not appropriately performed.

Furthermore, there is also a case where the valve opening and closing timing control mechanism is provided to control the opening and closing timing (valve timing) of the exhaust valve. In a case where the opening and closing timing of the valve opening and closing timing control mechanism provided in this manner is fixed to the most delay angle phase due to a failure, the overlap state where the exhaust valve and the intake valve are open at the same time is created, and thus, there is a case where the combustion after the starting becomes unstable due to the above-described reason.

Thus, a need exists for a controller for an internal combustion engine which is not susceptible to the drawback mentioned above.

SUMMARY

A feature of an aspect of this disclosure resides in a controller for an internal combustion engine. The internal combustion engine includes an intake valve which is opened and closed in association with rotation of an intake camshaft, an exhaust valve which is opened and closed in association with rotation of an exhaust camshaft, a throttle valve which sets an intake air amount of air into a combustion chamber, a fuel injection nozzle which injects fuel into the combustion chamber, an ignition plug which ignites an air-fuel mixture in the combustion chamber, a starter motor which drives and rotates a crankshaft, and an intake side valve opening and closing timing control mechanism which sets an opening and closing timing of the intake valve. The intake side valve opening and closing timing control mechanism includes a driving side rotating body which rotates in association with the crankshaft and a driven side rotating body which is connected to the intake camshaft to be relatively rotatable on a coaxial core with the intake camshaft, a phase control unit which sets a relative rotation phases, and an intake side phase sensor which measures the relative rotation phase between the driving side rotating body and the driven side rotating body. The controller for an internal combustion engine includes: a failure determination section which determines a failure state in a case where a relative rotation phase of the intake side valve opening and closing timing control mechanism does not change based on a measurement result of the intake side phase sensor when controlling the intake side valve opening and closing timing control mechanism after starting the driving of the starter motor and trying to change the relative rotation phase of the intake side valve opening and closing control mechanism in a start control for starting the internal combustion engine, in which, in a case where the failure determination section determines a failure, the controller performs at least one of an intake air amount increase control in which an opening degree of the throttle valve is increased to be larger than a set target, an ignition timing advance angle control in which injection of the fuel from the fuel injection nozzle is performed at a timing earlier than a set timing and ignition by the ignition plug is performed, and a multi-injection control in which the fuel is injected from the fuel injection nozzle immediately before the ignition in addition to the fuel injection from the fuel injection nozzle in an intake stroke.

As a situation where the failure state is determined at the time of starting, a situation where the relative rotation phase (opening and closing timing) of the intake side valve opening and closing timing control mechanism is fixed to the most delay angle phase and a situation where the relative rotation phase (opening and closing timing) is fixed to the intermediate phase without unlocking an intermediate lock mechanism, are considered. According to the configuration, in the situation where the opening and closing timing is fixed to the most delay angle phase, by performing the intake air amount increase control, the opening degree of the throttle valve is increased, and thus, it is possible to increase the intake air amount and to increase the compression ratio. Further, by performing the ignition timing advance angle control, even in a situation where the compression ratio is low and the combustion speed is low, the reliable combustion is possible. In addition, by performing the multi-injection control, even in the situation where the ignition is unlikely to cause combustion, combustion is reliably performed.

According to the configuration, in the situation where the opening and closing timing is fixed to the intermediate phase, the intake air amount is larger than that in the situation where the opening and closing timing is fixed to the most delay angle phase, and thus, the combustion can be easily performed by the ignition, but after the start of the combustion, since the internal EGR becomes excessive and the intake air amount (amount of fresh air) in the combustion chamber becomes insufficient, continuation of combustion becomes difficult. On the other hand, by increasing the opening degree of the throttle valve, it is possible to increase the intake air amount and to lower an EGR rate. In addition, in a case where the ignition timing advance angle control is performed, even in the situation where the combustion speed decreases from a high EGR rate, it is possible to reliably perform the combustion. In addition, even when the EGR rate is high, multi-injection control is performed, and accordingly, the combustion is ensured.

According to the feature of the aspect of this disclosure, in the situation where the intake side valve opening and closing timing control mechanism is fixed to the most delay angle phase, the startability is enhanced and a stable operation after the start is realized, and in the situation of being fixed to the intermediate phase, stable combustion after the start is realized. Therefore, a controller for an internal combustion engine which starts the internal combustion engine even in a failure state where the valve opening and closing timing control mechanism does not appropriately operate, and which realizes a stable operation, is configured.

A feature of another aspect of this disclosure resides in a controller for an internal combustion engine. The internal combustion engine includes an intake valve which is opened and closed in association with rotation of an intake camshaft, an exhaust valve which is opened and closed in association with rotation of an exhaust camshaft, a throttle valve which sets an intake air amount of air into a combustion chamber, a fuel injection nozzle which injects fuel into the combustion chamber, an ignition plug which ignites an air-fuel mixture in the combustion chamber, a starter motor which drives and rotates a crankshaft, and an exhaust side valve opening and closing timing control mechanism which sets an opening and closing timing of the exhaust valve. The exhaust side valve opening and closing timing control mechanism includes a driving side rotating body which rotates in association with the crankshaft and a driven side rotating body which is connected to the exhaust camshaft to be relatively rotatable on a coaxial core with the exhaust camshaft, a phase control unit which sets a relative rotation phases, and an exhaust side phase sensor which measures the relative rotation phase between the driving side rotating body and the driven side rotating body. The controller for an internal combustion engine includes: a failure determination section which determines a failure state in a case where a relative rotation phase of the exhaust side valve opening and closing timing control mechanism does not change based on a measurement result of the exhaust side phase sensor when controlling the exhaust side valve opening and closing timing control mechanism after starting the driving of the starter motor and trying to change the relative rotation phase of the exhaust side valve opening and closing control mechanism in a start control for starting the internal combustion engine, in which, in a case where the failure determination section determines a failure, the controller performs at least one of an intake air amount increase control in which an opening degree of the throttle valve is increased to be larger than a set target, an ignition timing advance angle control in which injection of the fuel from the fuel injection nozzle is performed at a timing earlier than a set timing and ignition by the ignition plug is performed, and a multi-injection control in which the fuel is injected from the fuel injection nozzle immediately before the ignition in addition to the fuel injection from the fuel injection nozzle in an intake stroke.

As a situation where the failure state is determined at the time of starting, a situation where the relative rotation phase (opening and closing timing) of the exhaust side valve opening and closing timing control mechanism is fixed to the most delay angle phase and a situation where the relative rotation phase (opening and closing timing) is fixed to the intermediate phase without unlocking an intermediate lock mechanism, are considered. Even in a situation where the relative rotation phase is fixed to either the most delay angle phase and the intermediate phase, the intake air amount does not become insufficient. However, in the situation of being fixed to the most delay angle phase, the overlap is larger than that in the situation of being fixed to the intermediate phase, the EGR rate is increased, and thus, the startability deteriorates and stable combustion after the start is inhibited.

On the other hand, according to the features of the aspects of this disclosure, in the situation where the relative rotation phase is fixed to the most delay angle phase, by executing the intake air amount increase control, the intake air amount increases, the EGR rate deteriorates, and the combustion is stabilized. Further, by performing the ignition timing advance angle control, even in a situation where the EGR rate is high and the combustion speed is low, the reliable combustion is possible. In addition, by performing the multi-injection control, even in the situation where the ignition is unlikely to cause combustion, combustion is reliably performed.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a flowchart of a most delay angle start routine;
FIG. 10 is a flowchart of an intermediate phase start routine.

DETAILED DESCRIPTION

Figure 1:
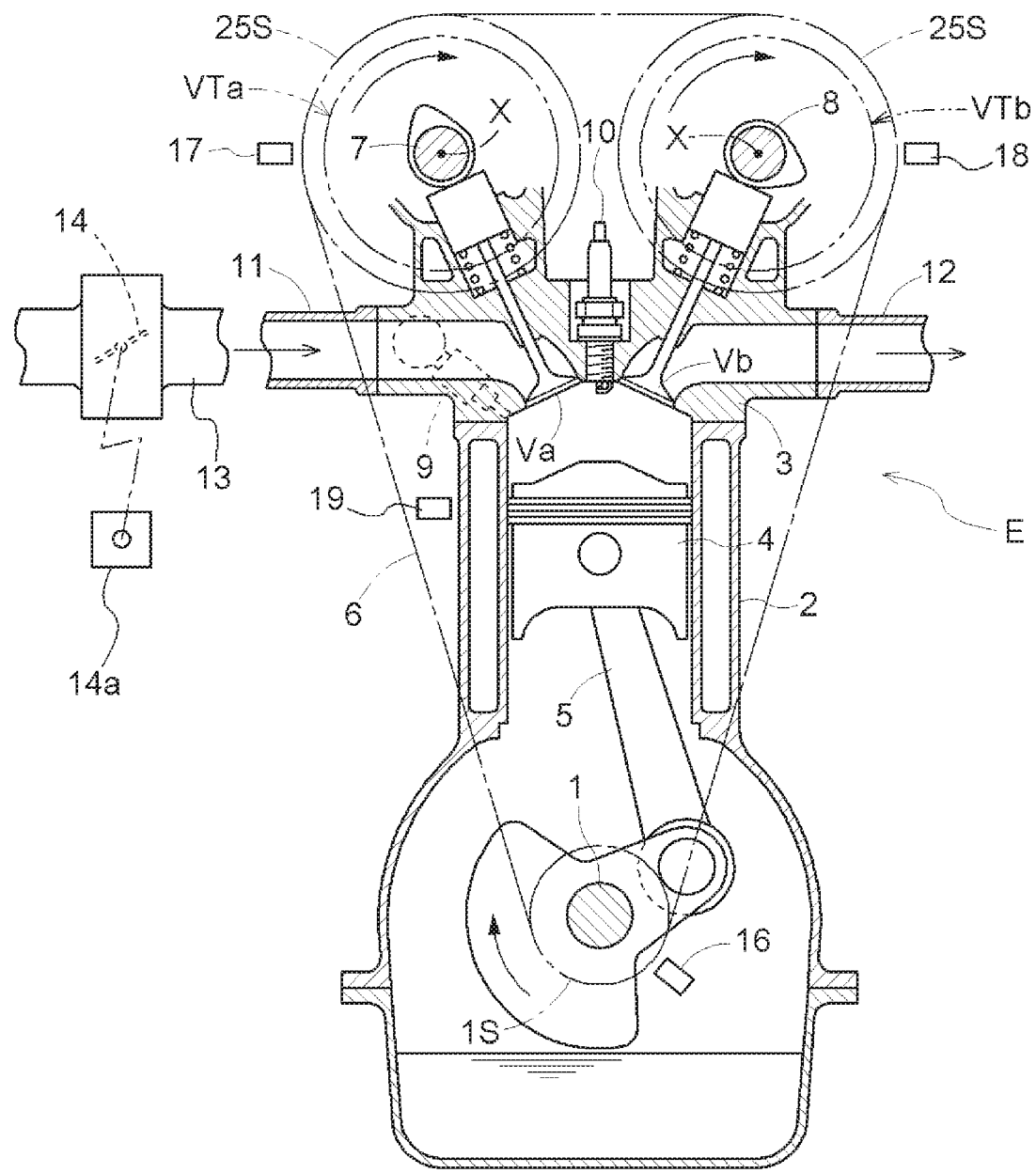
FIG. 1 is a sectional view including a part of a combustion chamber of an engine.
Figure 7:
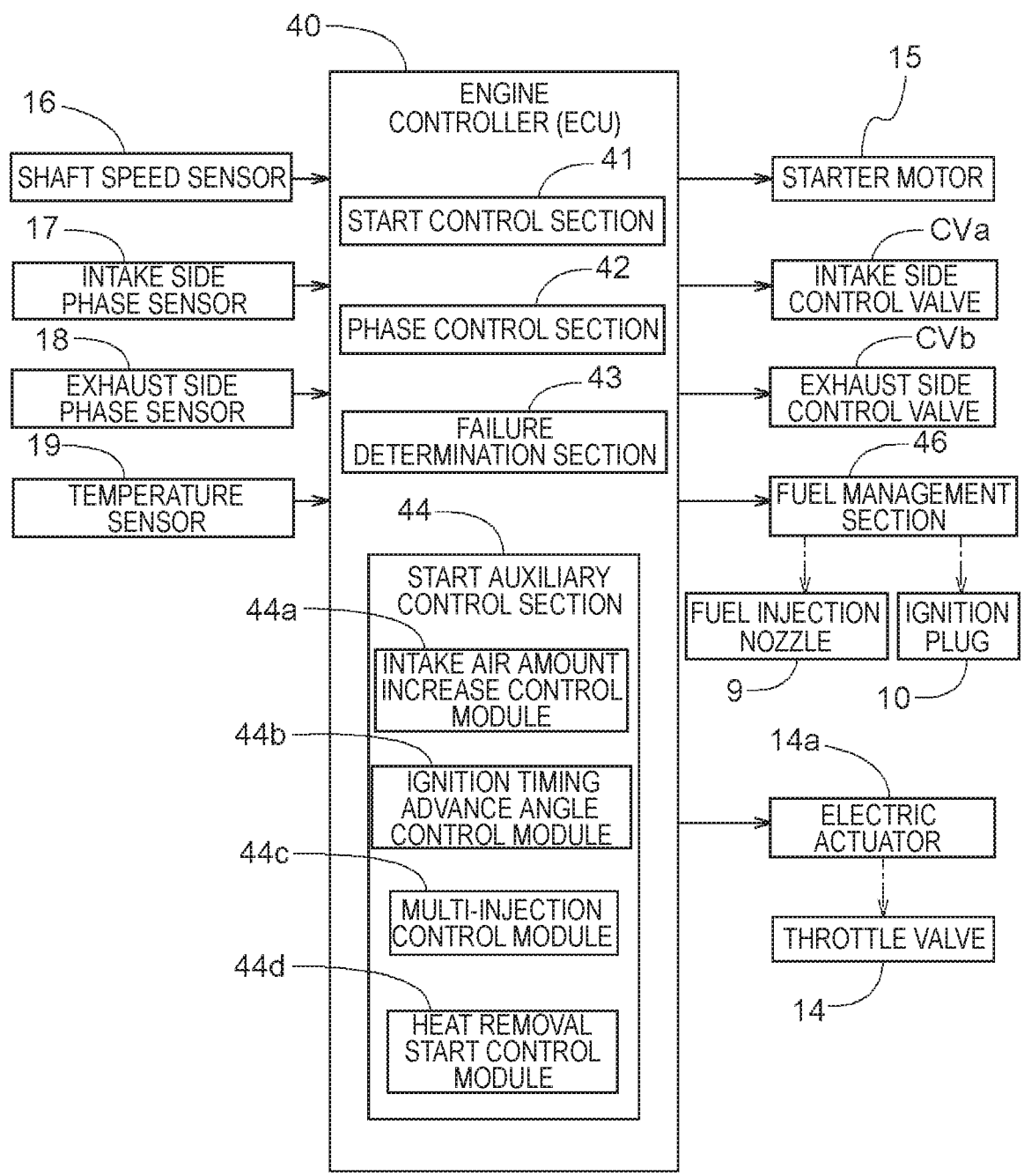
FIG. 7 is a block circuit diagram of a control system.

Hereinafter, an embodiment disclosed here will be described based on the drawings.
Basic Configuration As illustrated in FIG. 1, an engine E that serves as an internal combustion engine includes: an intake side valve opening and closing timing control mechanism VTa which sets an opening and closing timing (valve timing) of an intake valve Va; and an exhaust side opening and closing timing control mechanism VTb which sets the opening and closing timing (valve timing) of an exhaust valve Vb. The engine E, the intake valve opening and closing timing control mechanism VTa, and the exhaust valve opening and closing timing control mechanism VTb are controlled by an engine controller 40 which functions as an ECU as illustrated in FIG. 7.

The engine E (an example of an internal combustion engine) illustrated in FIG. 1 is supposed to be provided in a vehicle, such as a passenger car. In the engine E, a cylinder head 3 is connected to an upper portion of a cylinder block 2 which supports a crankshaft 1, a piston 4 is slidably accommodated in a plurality of cylinder bores formed in the cylinder block 2, and a piston 4 is connected to the crankshaft 1 by a connecting rod 5 to form a four-cycle type.

In the engine E, a combustion chamber is formed between the piston 4 and the cylinder head 3 in an internal space of the cylinder.

The cylinder head 3 is provided with the intake valve Va and the exhaust valve Vb for opening and closing the respective combustion chambers. An intake camshaft 7 which controls the intake valve Va and an exhaust camshaft 8 which controls the exhaust valve Vb are provided in the upper portion of the cylinder head 3. In addition, a timing chain 6 is wound across an output sprocket 1S of the crankshaft 1 and a sprocket 25S (refer to FIG. 2) of a rear plate 25 of the intake side valve opening and closing timing control mechanism VTa and the exhaust side valve opening and closing timing control mechanism Vtb.

The cylinder head 3 is provided with a fuel injection nozzle 9 which injects fuel into each of the combustion chambers and an ignition plug 10 for igniting an air-fuel mixture in each of the combustion chambers. The cylinder head 3 is provided with an intake manifold 11 for supplying air to the combustion chamber via the intake valve Va and an exhaust manifold 12 for sending combustion gas from the combustion chamber via the exhaust valve Vb.

Furthermore, an intake passage 13 connected to the intake manifold 11 is provided with a throttle valve 14 of which an opening degree is set by an electric actuator 14a so as to control the intake air amount.

In the engine E, as illustrated in FIG. 7, a starter motor 15 for driving and rotating the crankshaft 1 is provided, and as illustrated in FIG. 1, a shaft speed sensor 16 for detecting the rotation speed (rotational speed per unit time) of the crankshaft 1 is provided. In the vicinity of the intake side valve opening and closing timing control mechanism VTa, an intake side phase sensor 17 for detecting a relative rotation phase (hereinafter abbreviated as "relative rotation phase") between a driving rotor 21 and a driven rotor 22 (refer to FIGS. 2 and 3) is provided, and in the vicinity of the exhaust side valve opening and closing timing control mechanism VTb, an exhaust side phase sensor 18 for detecting the relative rotation phase is also provided. Further, the engine E is provided with a temperature sensor 19 for detecting the temperature of the engine E. The temperature sensor 19 may use a water temperature sensor for detecting the water temperature of cooling water for cooling the engine E.

Figure 2:
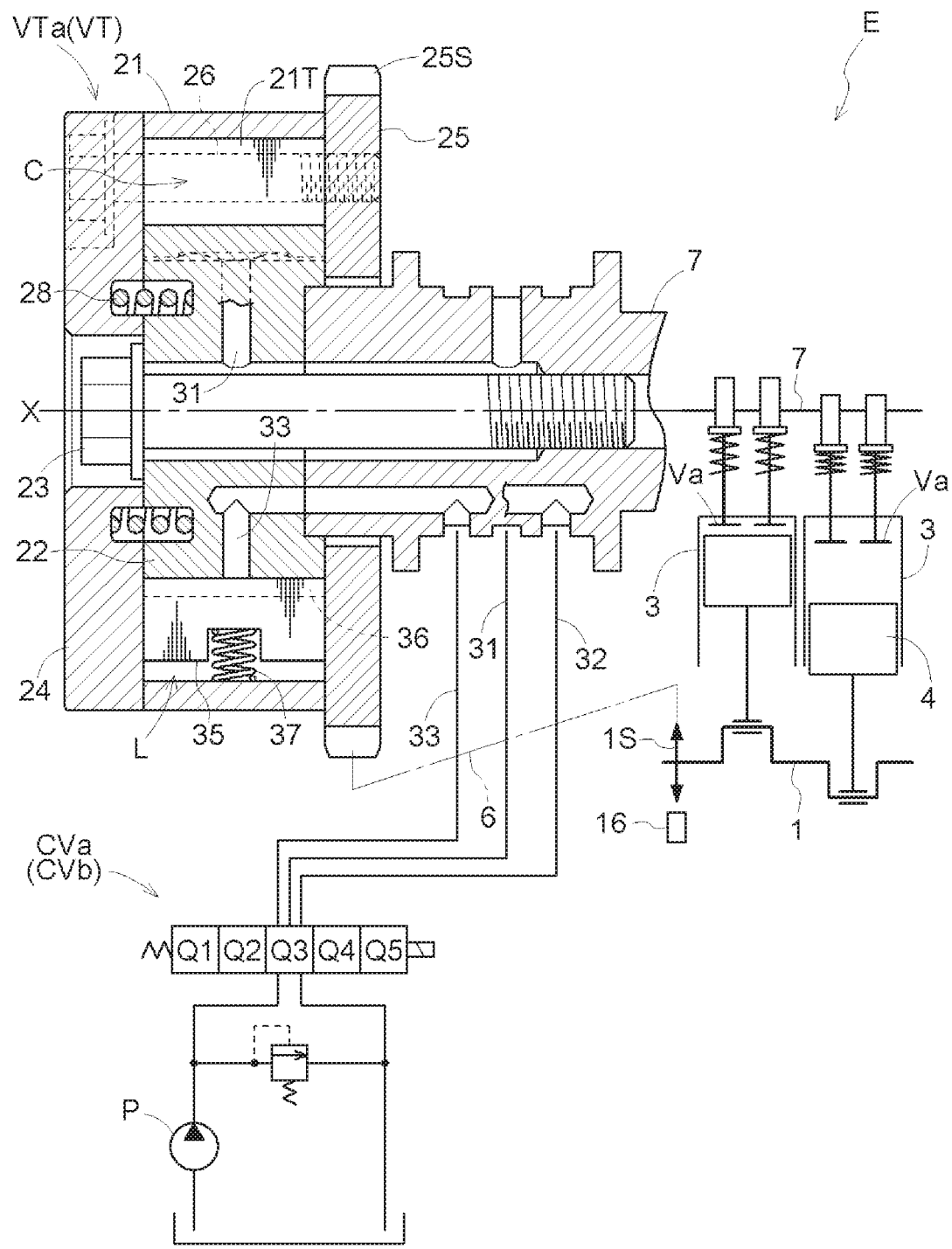
FIG. 2 is a view illustrating a section of an intake side valve opening and closing timing control mechanism and an oil passage configuration.
Figure 3:
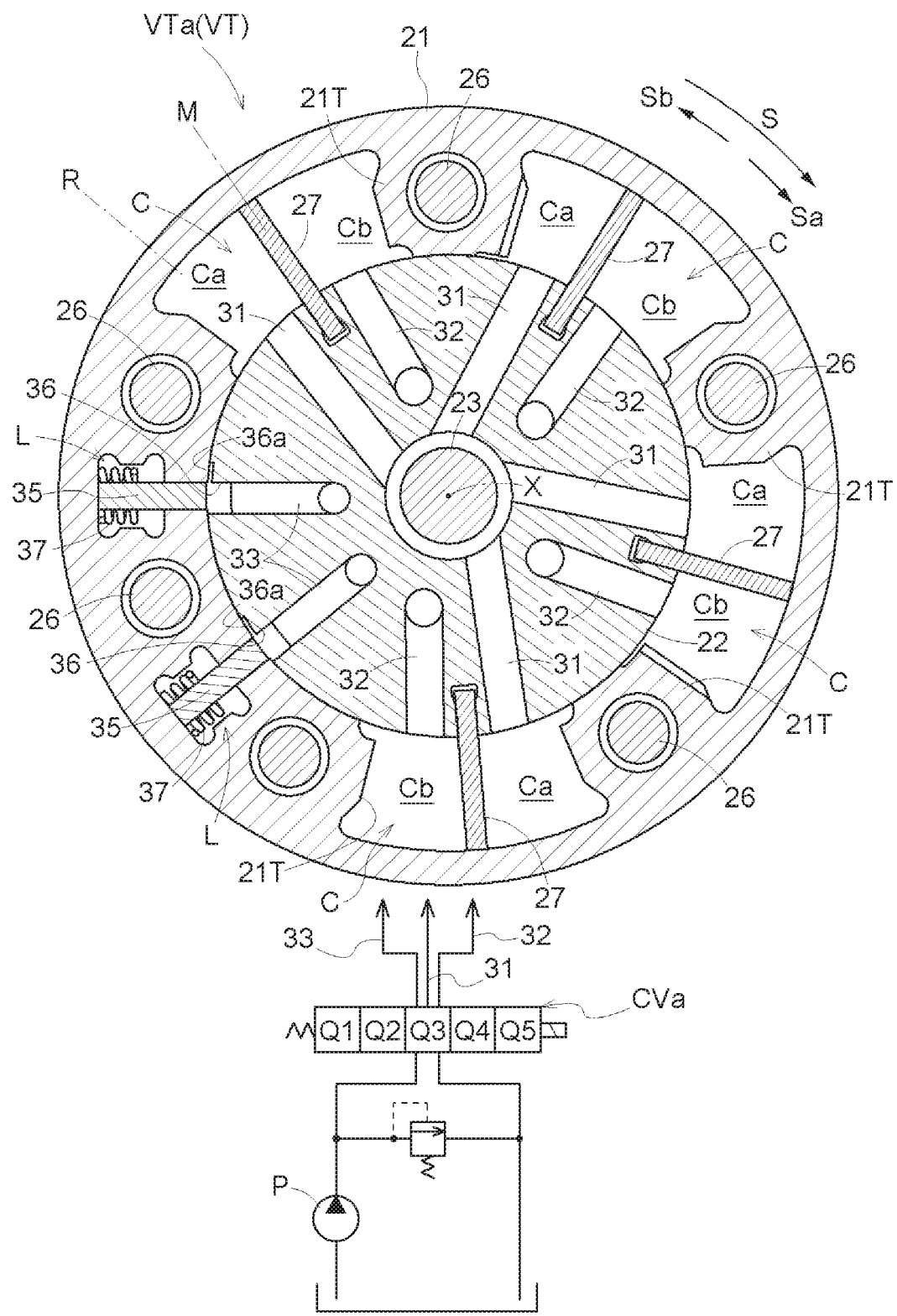
FIG. 3 is a sectional view of the intake side valve opening and closing timing control mechanism in an intermediate phase.

The intake side valve opening and closing timing control mechanism VTa and the exhaust side valve opening and closing timing control mechanism VTb are configured so as to operate by supply and discharge of hydraulic oil, and an intake side phase control valve CVa that corresponds to the intake side valve opening and closing timing control mechanism VTa and the exhaust side valve opening and closing timing control mechanism VTb is controlled by an exhaust side phase control valve CVb. In addition, as illustrated in FIGS. 2 and 3, a hydraulic pump P driven by the engine E is also provided. The hydraulic pump P supplies lubricating oil of an oil pan as hydraulic oil.

As illustrated in FIG. 7, the engine controller 40 includes a start control section 41, a phase control section 42, a failure determination section 43, and a start auxiliary control section 44. Details of the engine controller 40 and the control type will be described later.

Valve Opening and Closing Timing Control Mechanism

Since the intake side valve opening and closing timing control mechanism VTa and the exhaust side valve opening and closing timing control mechanism VTb have a common configuration, the configuration will be described taking the intake side valve opening and closing timing control mechanism VTa as an example. In addition, in the embodiment, as a superordinate concept of the intake side valve opening and closing timing control mechanism VTa and the exhaust side valve opening and closing timing control mechanism VTb, a valve opening and closing timing control mechanism VT will be described.

Figure 4:
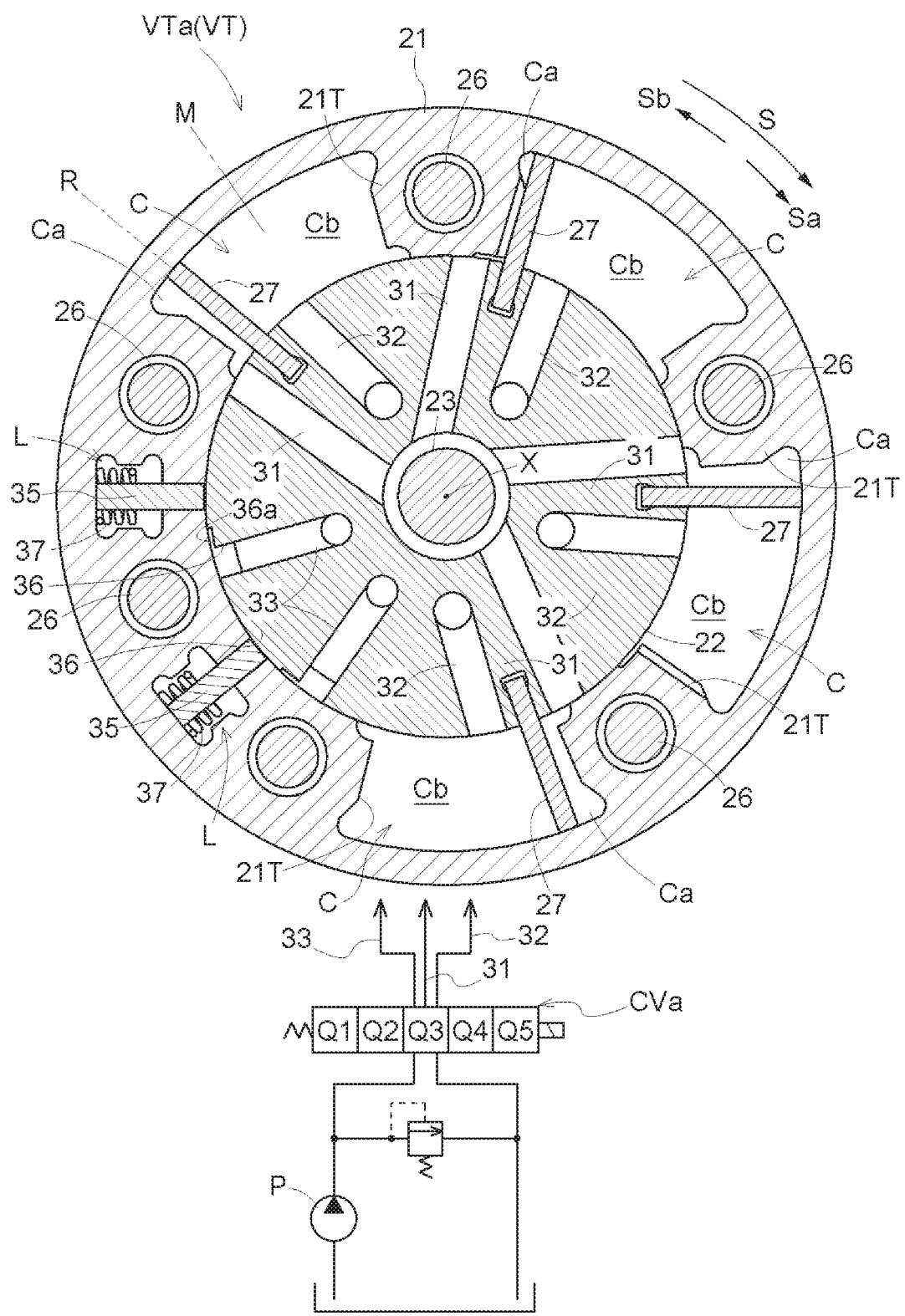
FIG. 4 is a sectional view of the intake side valve opening and closing timing control mechanism in a most delay angle phase.

As illustrated in FIGS. 2 to 4, the intake side valve opening and closing timing control mechanism VTa includes: a driving rotor 21 that serves as a driving side rotating body that synchronously rotates with the crankshaft 1; and a driven rotor 22 that serves as a driven side rotating body included in the driving rotor 21. The driving rotor 21 and the driven rotor 22 are disposed so as to be relatively rotatable on a coaxial core with a rotation axis core X of the intake camshaft 7, and the driven rotor 22 is connected to the intake camshaft 7 by a connecting bolt 23.

The driving rotor 21 is configured by fastening the front plate 24 and the rear plate 25 with a fastening bolt 26, and the driven rotor 22 is disposed at a position to be sandwiched between the front plate 24 and the rear plate 25.

A sprocket 25S is formed at an outer circumference of the rear plate 25 between the intake side valve opening and closing timing control mechanism VTa and the exhaust side valve opening and closing timing control mechanism VTb. As described above, by winding the timing chain 6 across the sprockets 25S and the output sprocket 1S provided in the crankshaft 1, the respective driving rotors 21 rotate synchronously with the crankshaft 1.

As illustrated in FIGS. 3 and 4, a plurality of protruding walls 21T which protrude radially inward are integrally formed on the driving rotor 21. The driven rotor 22 is formed in a columnar shape having an outer circumference which is in close contact with protruding ends of the plurality of protruding walls 21T, and a plurality of vanes 27 protrude radially outward from an outer circumferential part of the driven rotor 22.

From this configuration, a fluid pressure chamber C is formed between the adjacent protruding walls 21T in the rotational direction on the outside the driven rotor 22. By partitioning the fluid pressure chamber C with a vane 27, an advance angle chamber Ca and a delay angle chamber Cb are defined and formed. The fluid pressure chamber C, the vane 27, the advance angle chamber Ca, and the delay angle chamber Cb configure a phase control unit. As the phase control unit supplies the hydraulic oil to the advance angle chamber Ca and discharges the hydraulic oil from the delay angle chamber Cb, the relative rotational phase is displaced in an advance angle direction Sa, and on the contrary, as the hydraulic oil is supplied to the delay angle chamber Cb and the hydraulic oil is discharged from the advance angle chamber Ca, the relative rotation phase is displaced in a delay angle direction Sb.

As illustrated in FIGS. 3 and 4, in the intake side valve opening and closing timing control mechanism VTa, the driving rotor 21 rotates in a driving rotational direction S by a driving force from the crankshaft 1. A direction in which the driven rotor 22 rotates in the same direction as the driving rotational direction S with respect to the driving rotor 21 is referred to as the advance angle direction Sa, and a rotational direction in the opposite direction is referred to as the delay angle direction Sb. Further, an operating end in the delay angle direction in the relative rotation phase is referred to as a most delay angle phase R, and an operating end in the advance angle direction in the relative rotation phase is referred to as a most advance angle phase.

As illustrated in FIG. 2, a torsion spring 28 for applying a biasing force to the relative rotation phase from the most delay angle phase R to the intermediate phase M (refer to FIG. 3) is provided between the driven rotor 22 and the front plate 24. In the engine E, in a case where the crankshaft 1 rotates, a cam fluctuation torque acts to displace the relative rotation phase in the delay angle direction Sb. The torsion spring 28 obtains an assisting force for operating the relative rotation phase toward the intermediate phase M against the cam fluctuation torque.

The driven rotor 22 is provided with an advance angle control flow path 31 which communicates with the advance angle chamber Ca, a delay angle control flow path 32 which communicates with the delay angle chamber Cb, and a lock release flow path 33 for supplying the hydraulic oil to two lock mechanisms L which will be described later.

Valve Opening and Closing Timing Control Mechanism: Lock Mechanism

As illustrated in FIGS. 3 and 4, the valve opening and closing timing control mechanism VT includes two lock mechanisms L, and as the two lock mechanisms L simultaneously reach the locked state, the relative rotation phase between the driving rotor 21 and the driven rotor 22 are restricted to the intermediate phase M illustrated in FIG. 2. In addition, as the hydraulic oil is supplied to the lock release flow path 33, the locked state is released, and as the relative rotation phase reaches an intermediate phase M in a state where the hydraulic oil is discharged from the lock release flow path 33, the two lock mechanisms L are configured to reach the locked state. The intermediate phase M is set between the most advance angle phase where the relative rotation phase is the operating end in the advance angle direction Sa and the most delay angle phase R which is the operating end in the delay angle direction Sb.

As illustrated in FIGS. 3 and 4, each of the lock mechanism L includes a lock member 35 which is supported so as to freely go in and out of the driving rotor 21, a lock recessed portion 36 formed at the outer circumference of the driven rotor 22, a lock spring 37 that serves as a biasing member which protrudes and biases the lock member 35.

A plate-like member is used as the lock member 35 and is supported slidably with respect to a slit formed in the driving rotor 21 so as to be capable of approaching and separating from the rotation axis core X. A stepped groove portion 36a is formed at a position continuous to each of the lock recessed portion 36. When the groove portion 36a is engaged before the lock member 35 is fitted into the lock recessed portion 36 and the valve opening and closing timing control mechanism VT rotates alternately in the advance angle direction Sa and in the delay angle direction Sb around the rotation axis core X by the cam fluctuation torque, the groove portion 36a functions as a ratchet which assists fitting of the lock member 35 into the lock recessed portion 36.

Figure 5:
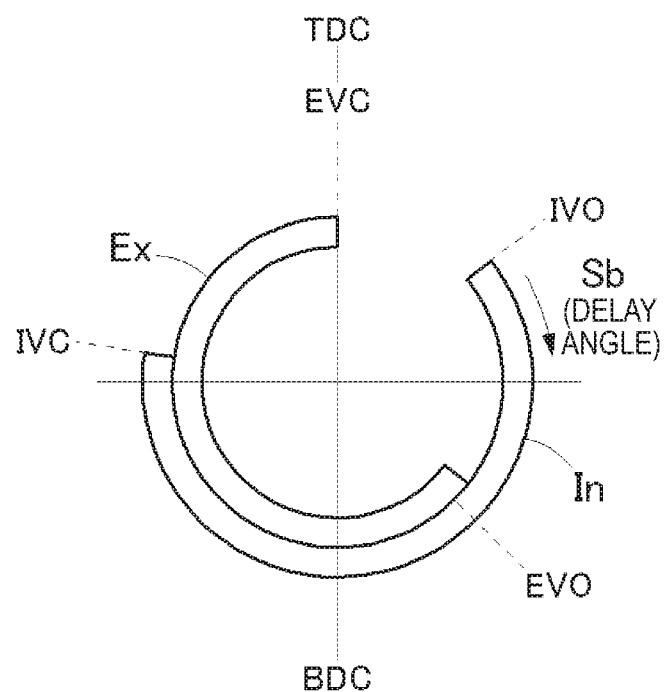
FIG. 5 is a timing diagram in the most delay angle phase.
Figure 6:
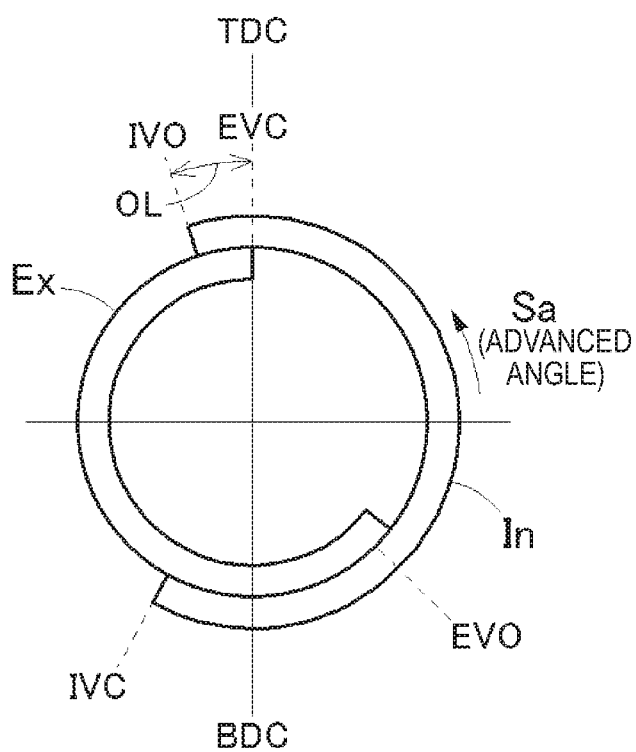
FIG. 6 is a timing diagram in the intermediate phase.

FIGS. 5 and 6 illustrate a timing diagram in which a region where the exhaust valve Vb is in the open state and the exhaust is performed is shown as an exhaust region Ex, and a region where the intake valve Va is in the open state and the region where the intake is performed is an intake region In, respectively. In the figures, the description is made in a state where an EVC which is the closing timing of the exhaust valve Vb (hereinafter, simply referred to as EVC) is fixed at the timing that matches a top dead center TDC.

As illustrated in FIG. 5, in a case where the intake side valve opening and closing timing control mechanism VTa is in the most delay angle phase R, the EVC which is the closing timing of the exhaust valve Vb is set to the top dead center TDC and an IVO which is an opening timing of the intake valve Va (hereinafter, simply referred to as IVO) is set to be larger than the top dead center TDC and to a position separated to the delay angle side. Furthermore, in the drawing, an EVO is the opening timing of the exhaust valve Vb, and an IVC is the closing timing of the intake valve Va.

In this manner, in a case where the intake side valve opening and closing timing control mechanism VTa is in the most delay angle phase R, since the IVO of the intake valve Va is largely displaced in the delay angle direction Sb, the load required for compression when starting the engine E is reduced, but the intake air amount is reduced.

As illustrated in FIG. 6, in a case where the intake side valve opening and closing timing control mechanism VTa is in the intermediate phase M, the EVC which is the closing timing of the exhaust valve Vb (hereinafter, simply referred to as EVC) is set to the top dead center TDC, the IVO of the intake valve Va is displaced toward the advance angle side from the top dead center TDC, and accordingly, an overlap OL is created.

In this manner, in a case where the intake side valve opening and closing timing control mechanism VTa is in the intermediate phase M, the fuel is supplied to the combustion chamber in a state where a part of the combustion gas remains in the combustion chamber by the overlap OL, and the ignition is performed.

Fluid Control Mechanism of Valve Opening and Closing Timing Control Device

The intake side phase control valve CVa and the exhaust side phase control valve CVb have a structure in which a spool is linearly accommodated in a reciprocating manner with respect to a housing, and as illustrated in FIGS. 2 and 3, are configured to be capable of being set at five positions, such as a first position Q1, a second position Q2, a third position Q3, a fourth position Q4, and a fifth position Q5. In addition, the spool is biased to one side by the spring, and an electromagnetic solenoid which applies an operating force in a direction against the biasing force is provided.

According to the configuration, the spool can be set to each position in the order of the first position Q1 to the fifth position Q5 due to an increase in electric power supplied to the electromagnetic solenoid. Hereinafter, an example of a specific control type of the hydraulic oil at each position will be described below.

At the first position Q1, in a state where the hydraulic oil is supplied to the delay angle control flow path 32, the hydraulic oil is discharged from the advance angle control flow path 31 and the lock release flow path 33. Accordingly, in the situation where the relative rotation phase is displaced in the delay angle direction Sb, the lock member 35 is engaged with the lock recessed portion 36 at the time when the relative rotation phase reaches the intermediate phase M, and the lock mechanism L reaches the locked state at the intermediate phase M and the relative rotation phase is held.

At the second position Q2, in a state where the hydraulic oil is supplied to the delay angle control flow path 32 and the lock release flow path 33, the hydraulic oil is discharged from the advance angle control flow path 31. Accordingly, the displacement of relative rotation phase in the delay angle direction Sb is realized. In addition, in a case where the lock mechanism L is in the locked state, the locked state is released.

At the third position Q3, the hydraulic oil is supplied to the lock release flow path 33, and supply of the hydraulic oil to the advance angle control flow path 31 and the delay angle control flow path 32 is stopped (cut off). Accordingly, the relative rotation phase is maintained at any phase.

At the fourth position Q4, in a state where the hydraulic oil is supplied to the advance angle control flow path 31 and the lock release flow path 33, the hydraulic oil is discharged from the delay angle control flow path 32. Accordingly, the displacement of relative rotation phase in the advance angle direction Sa is realized. In addition, in a case where the lock mechanism L is in the locked state, the locked state is released.

At the fifth position Q5, in a state where the hydraulic oil is supplied to the advance angle control flow path 31, the hydraulic oil is discharged from the delay angle control flow path 32 and the lock release flow path 33. Accordingly, in the situation where the relative rotation phase is displaced in the advance angle direction Sa, the lock member 35 is engaged with the lock recessed portion 36 at the time when the relative rotation phase reaches the intermediate phase M, and the lock mechanism L reaches the locked state at the intermediate phase M and the relative rotation phase is held.

Engine Controller

As illustrated in FIG. 7, the engine controller 40 functions as an ECU for controlling the engine E, and a signal from a shaft speed sensor 16, an intake side phase sensor 17, an exhaust side phase sensor 18, and a temperature sensor 19 is input thereinto. Further, the engine controller 40 outputs a control signal to the starter motor 15, the intake side phase control valve CVa, the exhaust side phase control valve CVb, a fuel management section 46, and the electric actuator 14a that controls the throttle valve 14. In this configuration, the fuel management section 46 manages fuel injection by a plurality of fuel injection nozzles 9 and ignition by a plurality of ignition plugs 10.

As described above, the engine controller 40 includes the start control section 41, the phase control section 42, the failure determination section 43, and the start auxiliary control section 44. Although the sections are configured by software, the sections may be configured by hardware or may be configured by a combination of software and hardware.

The start control section 41 controls the starting of the engine E by driving the starter motor 15. The phase control section 42 sets the relative rotation phase between the intake valve opening and closing timing control mechanism VTa and the exhaust valve opening and closing timing control mechanism VTb from the start of the start control of the engine E. The failure determination section 43 determines a failure between the intake side valve opening and closing timing control mechanism VTa and the exhaust side valve opening and closing timing control mechanism VTb.

In a case where the failure determination section 43 determines a failure at the time of starting the engine E, the start auxiliary control section 44 performs reliable starting and stabilizes the combustion after the starting.

In particular, the start auxiliary control section 44 includes an intake air amount increase control module 44a, an ignition timing advance angle control module 44b, a multi-injection control module 44c, and a heat removal start control module 44d.

The intake air amount increase control module 44a causes the intake air by increasing the opening degree of the throttle valve 14 to be larger than the set target. The ignition timing advance angle control module 44b injects the fuel from the fuel injection nozzle 9 and causes ignition by the ignition plug 10 at a timing earlier than the set timing at the time of cranking. In addition to the fuel injection at the fuel injection nozzle 9 in the intake stroke, the multi-injection control module 44c injects the fuel by the fuel injection nozzle 9 immediately before the ignition.

In a situation where the temperature detected by the temperature sensor 19 is equal to or higher than the set value, in a case where the start control starts the driving of the starter motor 15, the heat removal start control module 44d removes the air in the fuel chamber by scavenging the air by continuing the driving of the starter motor 15 even after the combustion start timing set in advance passes, the fuel injection is performed at the fuel injection nozzle 9 in the fuel chamber after scavenging the air, and the initial combustion by the ignition of the ignition plug 10 becomes possible.

Control Type

Figure 8:
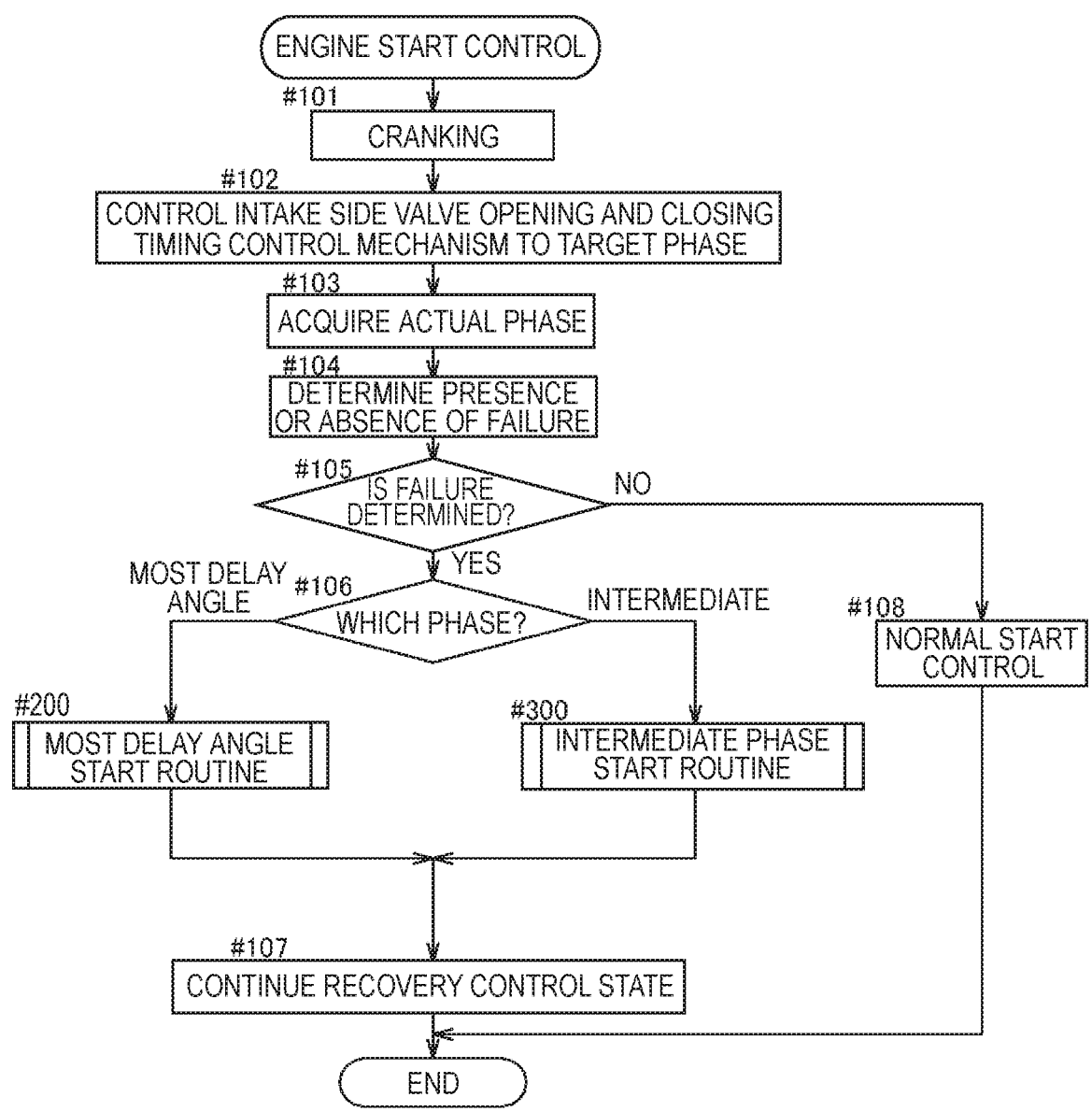
FIG. 8 is a flowchart of an engine start control.

A control type of the engine start control by the engine controller 40 is illustrated in the flowchart of FIG. 8. In the control illustrated in the flowchart, the presence or absence of a failure in the intake valve opening and closing timing control mechanism VTa is acquired when starting the engine E by the start control section 41, and in a case where there is a failure, the control of the start auxiliary control section 44 realizes the stabilized start.

Engine Start Control

In a case of acquiring the control signal for starting the engine E, the engine controller 40 starts the cranking by driving the starter motor 15 (controls by the start control section 41), performs a control for shifting the intake side valve opening and closing timing control mechanism VTa to the target phase by the control of the intake side phase control valve CVa (control by the phase control section 42), and acquires a detection signal (signal indicating an actual phase) from the intake side phase sensor 17 (steps #101 to #103).

In the control, since the hydraulic oil is supplied from the hydraulic pump P to the intake side valve opening and closing timing control mechanism VTa by cranking, in accordance with the cranking, the phase control section 42 can control for shifting the intake valve opening and closing timing control mechanism VTa to the target phase by the feedback control for acquiring the detection signal from the intake side phase sensor 17. On the other hand, in a case where the intake side valve opening and closing timing control mechanism VTa is in an inoperable situation or a hydraulic system, such as the hydraulic pump P or the intake valve opening and closing timing control mechanism VTa, is in an inoperable state, the relative rotation phase of the intake side valve opening and closing timing control mechanism VTa is not displaced.

In the failure determination section 43, by comparing the detection signal acquired from the intake side phase sensor 17 with the target phase, the determination of the failure is made from the presence or absence of displacement of the intake side valve opening and closing timing control mechanism VTa. Specifically, the detection signal from the intake side phase sensor 17 is acquired a plurality of times during the set time (approximately several seconds), and in a case where there is no change in the detection signal, the failure state is determined (steps #104 and #105).

As a failure of the intake side valve opening and closing timing control mechanism VTa, for some reason, a situation where the lock mechanism L is an unlocked state and the relative rotation phase is fixed to the most delay angle phase R (refer to FIG. 4) and a situation where the locked state of the lock mechanism L cannot be released and the relative rotation phase is fixed to the intermediate phase M (refer to FIG. 3), are assumed.

In addition, in a case where the relative rotation phase is at the most delay angle phase ("most delay angle" branch of the flowchart), a most delay angle start routine (step #200) is performed, and in a case where the relative rotation phase is at the intermediate phase M ("intermediate" branch of the flowchart), an intermediate phase start routine (step #300) is performed. In addition, a recovery control is performed after the routines, and even after the engine E is started, the recovery control state is continued (step #107).

On the other hand, in a case where it is determined in step #105 that there is no failure, the normal start control is performed (step #108).

In the control in either step #107 or #108, it is determined that the engine E has started when the rotational speed of the crankshaft 1 detected by the shaft speed sensor 16 exceeds a predetermined value, and in a case where it is determined that the engine E is started, the starter motor 15 is stopped.

Engine Start Control: Most Delay Angle Start Routine

The flowchart of FIG. 9 illustrates the control type in the most delay angle start routine (step #200).

In the control, as the recovery control, an intake air amount increase control (control by the intake air amount increase control module 44a), an ignition timing advance angle control (control by the ignition timing advance angle control module 44b), and a multi-injection control (control by multi-injection control module 44c), are performed until the engine E is started (steps #201 and #202).

In the recovery control of the embodiment, the intake air amount increase control, the ignition timing advance angle control, and the multi-injection control are performed in parallel, but the control type may be set so as to perform only one or two of the three types of control.

In other words, in a case where the intake side valve opening and closing timing control mechanism VTa is at the most delay angle phase R, the timing at which the intake valve Va starts to open (IVO in FIG. 5) is delayed, and thus, the intake air amount is insufficient. The intake air amount increase control increases the intake air amount by increasing (setting the maximum opening degree in the control) the opening degree of the throttle valve 14 so as to compensate for the insufficiency of the intake air amount to be larger than the set target set when starting the engine E.

As described above, in the situation where the intake air amount is insufficient, there is a case where the combustion speed is lowered and reliable combustion is not performed. For this reason, by the ignition timing advance angle control, the fuel is injected from the fuel injection nozzle 9 earlier than the original ignition timing, and reliable combustion is realized even in a situation where the combustion speed is low by advancing the ignition timing by the ignition plug 10.

Furthermore, in the situation where the intake air amount is insufficient, there is a case where the ignition is unlikely to cause combustion. In order to solve such inconvenience, reliable combustion is realized by performing the multi-injection control. In the control, in addition to the fuel injection by the fuel injection nozzle 9 performed in the intake stroke, the fuel is injected by the fuel injection nozzle 9 immediately before the ignition and the combustion by the ignition plug 10 is performed. Furthermore, in the multi-injection control, the number of times of fuel injection by the fuel injection nozzle 9 may be three or more.

In particular, in the multi-injection control, in accordance with the above-described ignition timing advance angle control, the fuel injection timing at the fuel injection nozzle 9 and the timing at the ignition plug 10 are advanced so as to start the combustion at the ignition timing set by this ignition timing advance angle control.

Engine Start Control: Intermediate Phase Start Routine

The flowchart of FIG. 10 illustrates the control type in the intermediated phase start routine (step #300).

In the control, in a case where the temperature of the engine E acquired by the temperature sensor 19 is equal to or higher than the set value, first, the heat removal start control (control by the heat removal start control module 44*d*) is performed, and accordingly, the heat in the combustion chamber is removed (the temperature is lowered) by scavenging the air by sending the air into the combustion chamber (steps #301 to #303). Furthermore, when performing the heat removal start control, by performing the control for increasing the intake air amount by the intake air amount increase control module 44*a* in parallel, the heat removal effect may be increased.

Next, as the recovery control, an intake air amount increase control (control by the intake air amount increase control module 44*a*), an ignition timing advance angle control (control by the ignition timing advance angle control module 44*b*), and a multi-injection control (control by multi-injection control module 44*c*), are performed until the engine E is started (steps #304 and #305).

In the recovery control of the embodiment, the intake air amount increase control, the ignition timing advance angle control, and the multi-injection control are performed, but the control type can also be set so as to perform only one or two of the three types of control.

In the engine E having the configuration, in a case where the relative rotation phase of the intake side valve opening and closing timing control mechanism VTa is fixed to the intermediate phase M, the opening of the intake valve Va is started in a state where the exhaust valve Vb is open, and accordingly, the overlap OL illustrated in FIG. 6 is created.

In the situation where the overlap OL is created, in a case where the combustion chamber is at a high temperature, since the compression ratio becomes excessive, the scavenging is performed under the control of the heat removal start control module 44*d*, the temperature of the combustion chamber is lowered, and accordingly, an increase in compression ratio is suppressed.

In addition, in the situation where the overlap OL is created, the intake air amount is not insufficient, but in a case where the combustion is started, in a state where a part of the combustion gas remains in the combustion chamber (state of the internal EGR), the combustion is performed as the fuel is supplied to the combustion room, and thus, the combustion is made unstable, for example, by lowering the combustion speed.

In response to such a situation, by performing the intake air amount increase control, the opening degree of the throttle valve 14 is enlarged to be larger than the set target set at the time of starting the engine E, and accordingly, the intake air amount is increased, and the combustion is reliably performed by reducing the EGR rate.

In addition, by performing the ignition timing advance angle control, the fuel is injected from the fuel injection nozzle 9 earlier than the original ignition timing, and reliable combustion is realized even in a situation where the combustion speed is low by advancing the ignition timing by the ignition plug 10.

In addition, by performing the multi-injection control, even in the situation where the ignition is unlikely to cause combustion, combustion is reliably performed. In the control, in addition to the fuel injection by the fuel injection nozzle 9 performed in the intake stroke, the fuel is injected by the fuel injection nozzle 9 immediately before the ignition and the combustion by the ignition plug 10 is performed. In addition, in the multi-injection control, the number of times of fuel injection by the fuel injection nozzle 9 may be three or more.

In this manner, even in a case where the intake side valve opening and closing timing control mechanism VTa fails to displace the relative rotation phase due to a failure, by performing the optimum control that corresponds to the phase in which the relative rotation phase is fixed (most delay angle start routine and intermediate phase start routine), and accordingly, the engine E is reliably started and a stable operation of the engine E is realized even after the start.

Furthermore, considering the situation where the intake side valve opening and closing timing control mechanism VTa is fixed to the most delay angle phase R due to a failure at the time of starting the engine E, for example, in a case where no mechanical sticking is applied similar to a case where the hydraulic pressure of the hydraulic oil is insufficient, a phenomenon in which the relative rotation phase is displaced alternately in the advance angle direction Sa and in the delay angle direction Sb by the action of the cam fluctuation torque.

As described above, since the stepped groove portion 36*a* formed at the position which is continuous to the lock recessed portion 36 of the lock mechanism L functions by ratchet, in a case where the relative rotation phase fluctuates due to the action of the cam fluctuation torque, after the lock member 35 is engaged with the groove portion 36*a* in advance in accordance with the fluctuation, it is also possible to shift to the locked state by the engagement with the lock recessed portion 36. By utilizing the effective surface, the starting of the engine E is excellently performed.

Another Embodiment of Control Type

Figure 11:
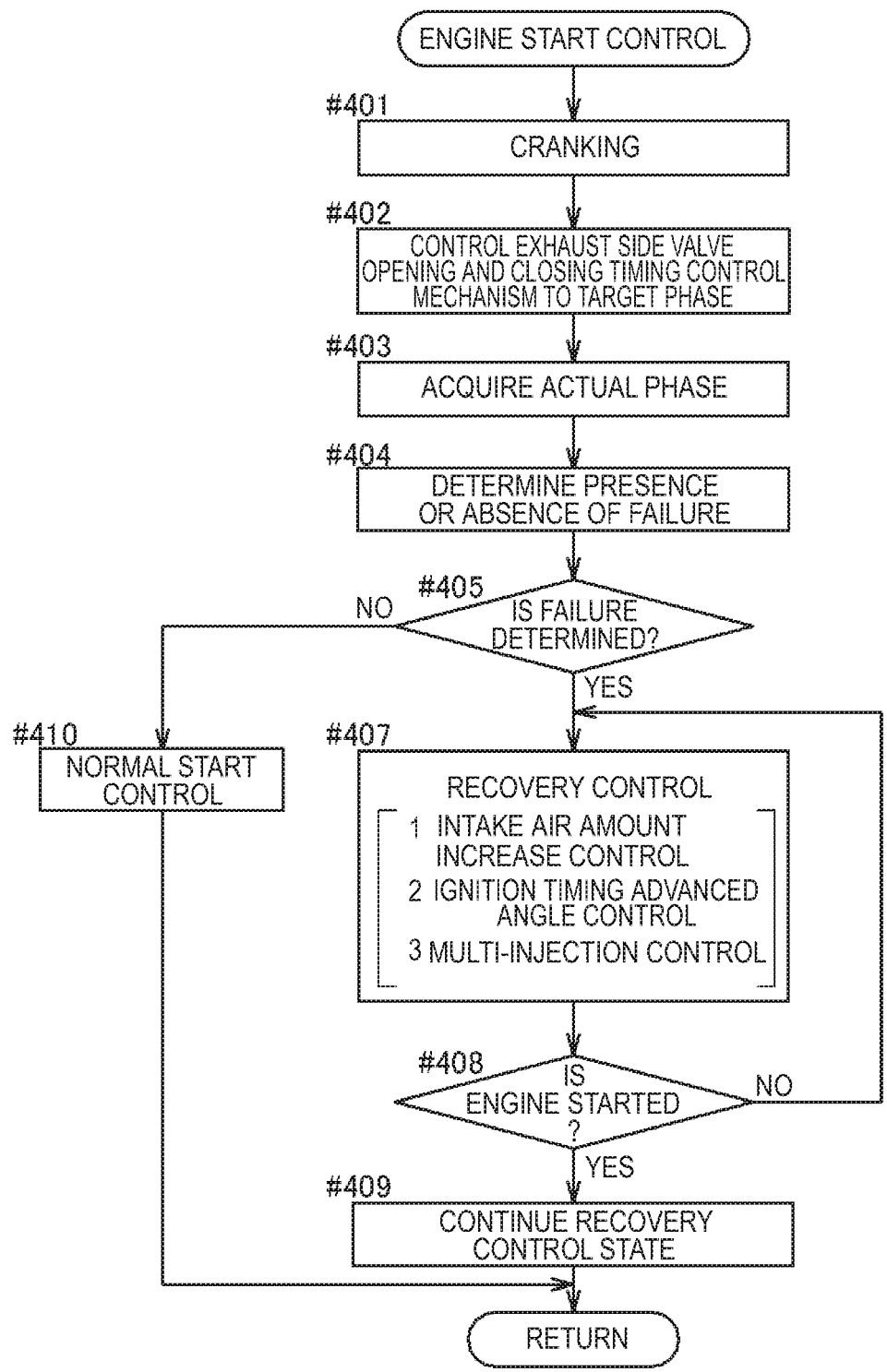
FIG. 11 is a flowchart of an engine start control according to another embodiment of a control type.

A control type by the start control section 41 by the engine controller 40 is illustrated in the flowchart of FIG. 11. In the control illustrated in the flowchart, the control mode is set so as to acquire the presence or absence of a failure in the exhaust side valve opening and closing timing control mechanism VTb and to perform the optimum control in a case of a failure.

Engine Start Control

In a case of acquiring the control signal for starting the engine E, the engine controller 40 starts the cranking by driving the starter motor 15 (controls by the start control section 41), performs a control for shifting the exhaust side valve opening and closing timing control mechanism VTb to the target phase by the control of the exhaust side phase control valve CVb (control by the phase control section 42), and acquires a detection signal (signal indicating an actual phase) from the exhaust side phase sensor 18 (steps #401 to #403).

In the control, since the hydraulic oil is supplied from the hydraulic pump P to the exhaust side valve opening and closing timing control mechanism VTb by cranking, in accordance with the cranking, the phase control section 42 can control for shifting the exhaust valve opening and closing timing control mechanism VTb to the target phase by the feedback control for acquiring the detection signal from the exhaust side phase sensor 18. On the other hand, in a case where the exhaust side valve opening and closing timing control mechanism VTb is in an inoperable situation or an hydraulic system, such as the hydraulic pump P or the exhaust valve opening and closing timing control mechanism VTb, is in an inoperable state, the relative rotation phase of the exhaust side valve opening and closing timing control mechanism VTb is not displaced.

In the failure determination section, by comparing the detection signal acquired from the exhaust side phase sensor 18 with the target phase, the determination of the failure is made from the presence or absence of displacement of the exhaust side valve opening and closing timing control mechanism VTb. Specifically, the detection signal from the exhaust side phase sensor 18 is acquired a plurality of times during the set time (approximately several seconds), and in a case where there is no change in the detection signal, the failure state is determined (steps #404 and #405).

As a failure of the exhaust side valve opening and closing timing control mechanism VTb, for some reason, a situation where the lock mechanism L is an unlocked state and the relative rotation phase is fixed to the most delay angle phase R (refer to FIG. 4) and a situation where the locked state of mechanism L cannot be released and the relative rotation phase is fixed to the intermediate phase M (refer to FIG. 3), are assumed. However, even in a situation where the relative rotation phase is fixed to the most delay angle phase R, and even in a situation where the relative rotation phase is fixed to the intermediate phase M, without reducing the intake air amount, for example, in a case of being fixed to a timing at which the EVC matches the top dead center TDC at the intermediate phase M, the overlap OL (refer to FIG. 6) is created. In addition, in a case of being fixed to the most delay angle phase R, the overlap OL having a larger lap amount than that of the overlap OL illustrated in FIG. 6 is created.

In this manner, in a case where the overlap OL is created, the intake air amount is not insufficient, but in a case where the combustion is started, in a state where a part of the combustion gas remains in the combustion chamber (state of the internal EGR), the combustion is performed as the fuel is supplied to the combustion room, and thus, the combustion is made unstable, for example, by lowering the combustion speed.

In such a situation, as the recovery control, an intake air amount increase control (control by the intake air amount increase control module 44a), an ignition timing advance angle control (control by the ignition timing advance angle control module 44b), and a multi-injection control (control by multi-injection control module 44c), are performed until the engine E is started (steps #407 and #408).

In the controls, by performing the intake air amount increase control, the opening degree of the throttle valve 14 is enlarged to be larger than the set target set at the time of starting the engine E, and accordingly, the intake air amount is increased, and the combustion is reliably performed by reducing the EGR rate.

In addition, by performing the ignition timing advance angle control, the fuel is injected from the fuel injection nozzle 9 earlier than the original ignition timing, and reliable combustion is realized even in a situation where the combustion speed is low by advancing the ignition timing by the ignition plug 10.

Furthermore, by performing the multi-injection control, even in the situation where the ignition is unlikely to cause combustion, combustion is reliably performed. In the control, in addition to the fuel injection by the fuel injection nozzle 9 performed in the intake stroke, the fuel is injected by the fuel injection nozzle 9 immediately before the ignition and the combustion by the ignition plug 10 is performed. In addition, in the multi-injection control, the number of times of fuel injection by the fuel injection nozzle 9 may be three or more.

In particular, in the multi-injection control, in accordance with the above-described ignition timing advance angle control, the fuel injection timing at the fuel injection nozzle 9 and the timing at the ignition plug 10 are advanced so as to start the combustion at the ignition timing set by this ignition timing advance angle control.

In the routine, the recovery control state is continued even after the engine E is started (step #409). In addition, in a case where it is determined in step #405 that there is no failure, the normal start control is performed (step #410).

In this manner, even in a case where the exhaust side valve opening and closing timing control mechanism VTb fails to displace the relative rotation phase due to a failure, by performing the engine start control illustrated in FIG. 11, the engine E is reliably started and a stable operation of the engine E is realized even after the start.

In the recovery control, the intake air amount increase control, the ignition timing advance angle control, and the multi-injection control are performed in parallel, but the control type may be set so as to perform only one or two of the three types of control.

Another Embodiment

The embodiment disclosed here may be configured in the following manner besides the above-described embodiments (those having the same functions as those in the embodiment are denoted by the same reference numerals as in the embodiments).

(a) It is also possible to use a configuration in which the lock mechanism L fixed to the intermediate phase M as the exhaust side valve opening and closing timing control mechanism VTb is not provided. In such a configuration, fixing to the most delay angle phase R is assumed due to a failure, but even in a case of fixing in this manner, by executing the control according to the flowchart illustrated in FIG. 11, the startability of the engine E is increased and a stable operation is realized.

(b) In addition to the configuration in which the lock mechanism L locks the relative rotation phase to the intermediate phase M as the intake side valve opening and closing timing control mechanism VTa, a configuration of locking the relative rotation phase to the most delay angle phase may be employed. In such a configuration, in a case where the state of being locked to the most delay angle phase is fixed, it is possible to respond to the case by performing the control of the most delay angle start routine illustrated in FIG. 9.

(c) The intake side valve opening and closing timing control mechanism VTa and the exhaust side valve opening and closing timing control mechanism VTb may be an electric type. In other words, the phenomenon in which the relative rotation phase is fixed due to a failure also occurs in the electric type valve opening and closing timing control mechanism, and in a case of such a failure, the phenomenon in which the relative rotation phase reaches the most delay angle phase R also occurs due to the action of the cam fluctuation torque. Since the electric type valve opening and closing timing control mechanism usually does not include a lock mechanism, the control for increasing the startability at the most delay angle phase R when starting the engine E may be considered.

(d) A phase control valve which controls the phase of the valve opening and closing timing control mechanism VT and a lock control valve which controls the lock mechanism L of the valve opening and closing timing control mechanism VT, are provided. In this configuration, it is possible to reliably control the lock mechanism L.

(e) At the time of actual control, since a case where the intake side valve opening and closing timing control mechanism VTa and the exhaust side valve opening and closing timing control mechanism VTb fall into the failure state at the same time is unlikely to be considered, for example, in a case where one side is in a failure state, in addition to the recovery control described in the embodiment, the control for adjusting the overlap OL by controlling non-failure among the intake side valve opening and closing timing control mechanism VTa and the exhaust side valve opening and closing timing control mechanism VTb may be performed.

The embodiments disclosed here can be applied to a controller for an internal combustion engine having a valve opening and closing timing control mechanism which sets an opening and closing timing of a valve provided in a combustion chamber.

As another configuration, the controller for an internal combustion engine may further include a temperature sensor which measures the temperature of the internal combustion engine, and in a case where the failure determination section determines the failure state in a situation where the temperature detected by the temperature sensor is equal to or higher than a set value, the controller may perform a heat removal start control in which scavenging of the air is performed by continuing the driving of the starter motor even after a predetermined combustion start timing has passed after starting the driving of the starter motor in the start control and an initial combustion is performed by injecting the fuel from the fuel injection nozzle into the fuel chamber after the scavenging.

In a case where the temperature of the internal combustion engine exceeds the set value and is a high temperature, there is a case where not only the compression ratio becomes excessive due to the influence of heat but also natural ignition earlier than the ignition timing due to the influence of heat and rough idling occurs. On the other hand, it is possible to initiatively lower the temperature of the combustion chamber by circulating the air into the combustion chamber by continuing the driving of the starter motor and performing the scavenging by the heat removal start control. After this, by performing the first combustion, it is possible to enable a stable operation by performing appropriate starting.

As another configuration the controller for an internal combustion engine may further include a temperature sensor which measures the temperature of the internal combustion engine, and in a case where the failure determination section determines the failure state and in a case where the internal combustion engine is started and reaches an idling state in a situation where the temperature detected by the temperature sensor is equal to or higher than a set value, the controller may perform the intake air amount increase control in which the opening degree of the throttle valve is increased to be larger than a target opening degree at the time of idling.

In a case where the intake side valve opening and closing timing control mechanism is in the failure state, it is assumed that the relative rotation phase is fixed to the most delay angle phase or the intermediate phase. In this configuration, in a case where the internal combustion engine is started in a state where the relative rotational phase (opening and closing timing) is fixed to the most delay angle phase, since the insufficiency of the intake air amount is continued, it is possible to improve the insufficiency of the intake air amount by increasing the opening degree of the throttle valve to be larger than the target opening degree at the time of idling by the intake air amount increase control. Further, in a case where the internal combustion engine is started in a state where the relative rotation phase (opening and closing timing) is fixed to the intermediate phase, the EGR rate increases and the combustion becomes unstable, but it is possible to stabilize the combustion by increasing the opening degree of the throttle valve to be larger than the target opening degree at the time of idling and by lowering the EGR rate.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A controller for an internal combustion engine, the internal combustion engine including:
    an intake valve which is opened and closed in association with rotation of an intake camshaft,
    an exhaust valve which is opened and closed in association with rotation of an exhaust camshaft,
    a throttle valve which sets an intake air amount of air into a combustion chamber,
    a fuel injection nozzle which injects fuel into the combustion chamber,
    an ignition plug which ignites an air-fuel mixture in the combustion chamber,
    a starter motor which drives and rotates a crankshaft, and
    an intake side valve opening and closing timing control mechanism which sets an opening and closing timing of the intake valve,
  the intake side valve opening and closing timing control mechanism including:
    a driving side rotating body which rotates in association with the crankshaft and a driven side rotating body which is connected to the intake camshaft to be relatively rotatable on a coaxial core with the intake camshaft,
    a phase control unit which sets a relative rotation phase, and
    an intake side phase sensor which measures the relative rotation phase between the driving side rotating body and the driven side rotating body,
  the controller comprising:
    a failure determination section which determines a failure state in a case where a relative rotation phase of the intake side valve opening and closing timing control mechanism does not change based on a measurement result of the intake side phase sensor when controlling the intake side valve opening and closing timing control mechanism after starting the driving of the starter motor and trying to change the relative rotation phase of the intake side valve opening and closing control mechanism in a start control for starting the internal combustion engine, wherein, in a case where the failure determination section determines a failure, the controller performs at least one of an intake air amount increase control in which an opening degree of the throttle valve is increased to be larger than a set target, an ignition timing advance angle control in which injection of the fuel from the fuel injection nozzle is performed at a timing earlier than a set timing and ignition by the ignition plug is performed, and a multi-injection control in which the fuel is injected from the fuel injection nozzle immediately before the ignition in addition to the fuel injection from the fuel injection nozzle in an intake stroke.

2. The controller for an internal combustion engine according to claim 1, further comprising:

a temperature sensor which measures a temperature of the internal combustion engine, wherein, in a case where the failure determination section determines the failure state in a situation where the temperature detected by the temperature sensor is equal to or higher than a set value, the controller performs a heat removal start control in which scavenging of the air is performed by continuing the driving of the starter motor even after a predetermined combustion start timing has passed after starting the driving of the starter motor in the start control and an initial combustion is performed by injecting the fuel from the fuel injection nozzle into the fuel chamber after the scavenging.

3. The controller for an internal combustion engine according to claim 1, further comprising:

a temperature sensor which measures a temperature of the internal combustion engine, wherein, in a case where the failure determination section determines the failure state and in a case where the internal combustion engine is started and reaches an idling state in a situation where the temperature detected by the temperature sensor is equal to or higher than a set value, the controller performs the intake air amount increase control in which the opening degree of the throttle valve is increased to be larger than a target opening degree at the time of idling.

4. A controller for an internal combustion engine, the internal combustion engine including:

an intake valve which is opened and closed in association with rotation of an intake camshaft, an exhaust valve which is opened and closed in association with rotation of an exhaust camshaft, a throttle valve which sets an intake air amount of air into a combustion chamber, a fuel injection nozzle which injects fuel into the combustion chamber, an ignition plug which ignites an air-fuel mixture in the combustion chamber, a starter motor which drives and rotates a crankshaft, and an exhaust side valve opening and closing timing control mechanism which sets an opening and closing timing of the exhaust valve, the exhaust side valve opening and closing timing control mechanism including:

a driving side rotating body which rotates in association with the crankshaft and a driven side rotating body which is connected to the exhaust camshaft to be relatively rotatable on a coaxial core with the exhaust camshaft, a phase control unit which sets a relative rotation phase, and an exhaust side phase sensor which measures the relative rotation phase between the driving side rotating body and the driven side rotating body, the controller comprising:

a failure determination section which determines a failure state in a case where a relative rotation phase of the exhaust side valve opening and closing timing control mechanism does not change based on a measurement result of the exhaust side phase sensor when controlling the exhaust side valve opening and closing timing control mechanism after starting the driving of the starter motor and trying to change the relative rotation phase of the exhaust side valve opening and closing control mechanism in a start control for starting the internal combustion engine, wherein, in a case where the failure determination section determines a failure, the controller performs at least one of an intake air amount increase control in which an opening degree of the throttle valve is increased to be larger than a set target, an ignition timing advance angle control in which injection of the fuel from the fuel injection nozzle is performed at a timing earlier than a set timing and ignition by the ignition plug is performed, and a multi-injection control in which the fuel is injected from the fuel injection nozzle immediately before the ignition in addition to the fuel injection from the fuel injection nozzle in an intake stroke.

\* \* \* \* \*